March 8, 1966   J. N. SCOTT, JR., ET AL   3,238,569
MOLDING DIE
Filed June 1, 1964
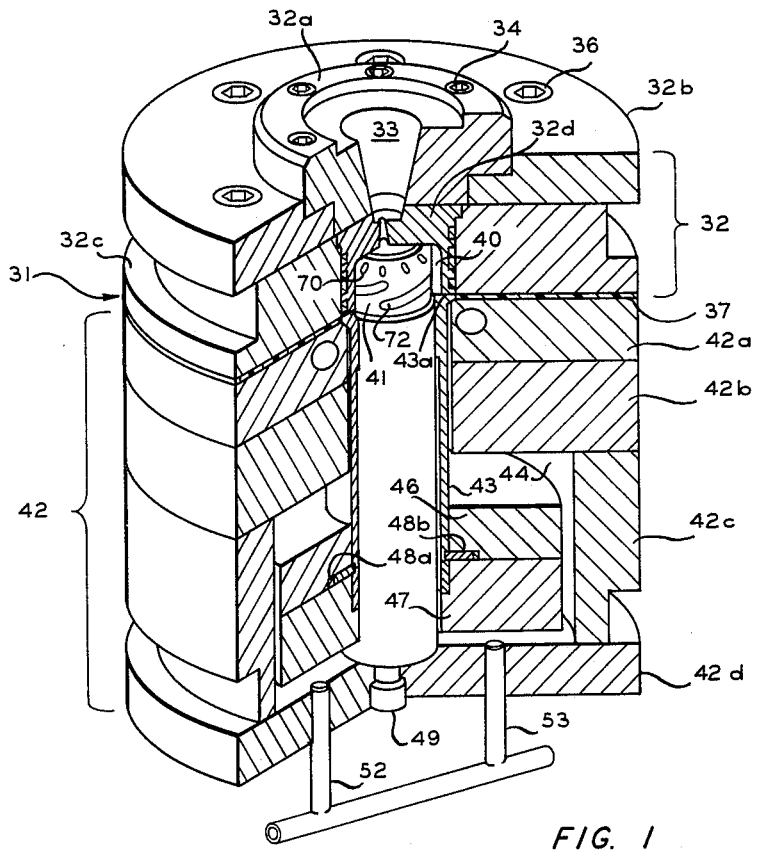
FIG. 1
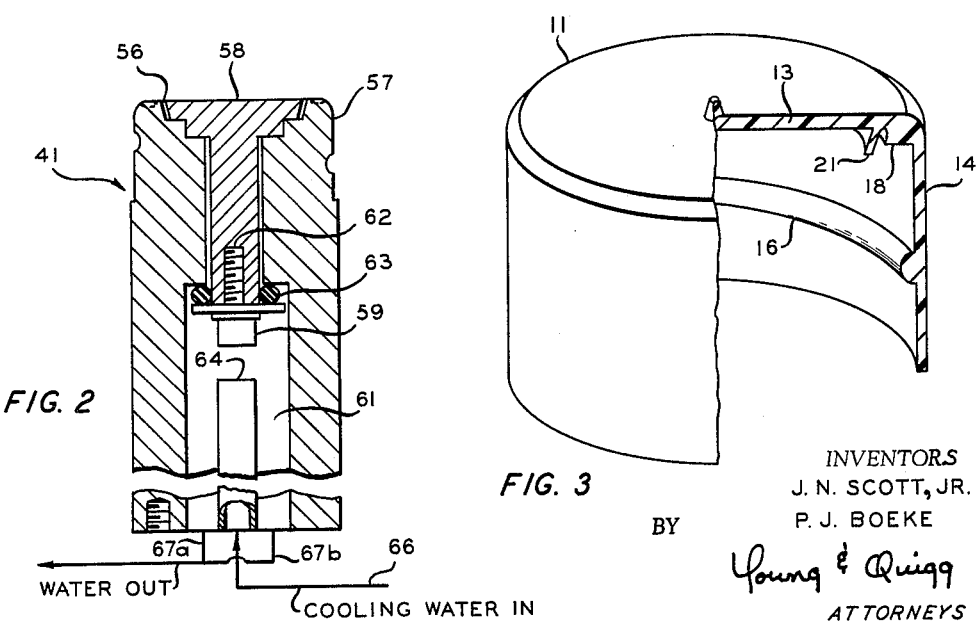
FIG. 2
FIG. 3
INVENTORS
J. N. SCOTT, JR.
P. J. BOEKE
BY *Young & Quigg*
ATTORNEYS United States Patent Office 3,238,569
Patented Mar. 8, 1966

3,238,569
MOLDING DIE
John N. Scott, Jr., and Paul J. Boeke, Bartlesville, Okla., assignors to Phillips Petroleum Company, a corporation of Delaware
Filed June 1, 1964, Ser. No. 371,581
3 Claims. (Cl. 18—42)

The invention relates to improvements in molding plastic materials. In one aspect this invention relates to a mold core structure for forming intricate shapes. In another aspect this invention relates to an improved apparatus for removing formed articles from mold cores.

This invention is a continuation-in-part of our copending application Serial Number 248,414 filed December 31, 1962. In our copending application a venting-type closure assembly for plastic containers is described and claimed. This disclosure is directed to novel molding apparatus for forming such a closure assembly and for removing the thus molded articles from the mold.

Accordingly, an object of this invention is to provide molding apparatus for forming intricate articles as one formative unit.

Another object of this invention is to provide novel mold core means for releasing intricate molded articles without degradation thereto.

A further object of this invention is to provide molding apparatus for forming and removing the closure assembly of our copending application.

Other objects, aspects and advantages of this invention will be apparent to one skilled in the art upon further study of this disclosure, the drawings and appended claims.

In accordance with our invention, the core section of a mold is provided with an axially movable center section, which is biased in the seated position during introduction of polymer melt and moves outwardly from the core body during stripping of the article from the core to relieve shearing stress on the article. Likewise, the improvement in removing the formed article comprising permitting the center section of core to move outwardly during stripping from the core.

A specific structure of a mold apparatus modified in accordance with our invention will be described in detail with reference to the accompanying drawing, of which—

FIGURE 1 is a perspective view, in full section, of an assembled injection mold, modified according to our invention;

FIGURE 2 is an elevational view, in full section, of the novel core section of our invention; and FIGURE 3 is a perspective view, in partial section, of a closure cap formed by the mold of FIGURE 1.

Referring now to FIGURE 1, an injection mold assembly is shown for forming a screw attachable venting-type closure assembly for containers. Molten plastic is passed into the molding die generally designated 31, by an extruder and connecting conduit (not shown). The upper mold half 32 comprises upper central member 32a, which defines sprue 33 and is secured to intermediate member 32b, by Allen screws, such as 34. Member 32b seats on lower member 32c and is secured thereto by Allen screws, such as 36. The lower surface of member 32c defines the parting line 37 of the mold sections. Defining the outer boundary of the mold cavity 40 is lower central member or insert 32d.

Inner cylindrical core half 41 defines the inner boundary of the mold cavity 40. Groove 72 defines a spiral depression in and around the surface of core half 41, thus providing a thread about the internal surface of the skirt of the molded closure assembly. Alternately groove 72 can be a plurality of spaced depressions in a spiral line about core half 41. Furthermore, element 72 can be a projection on core half 41, thus providing depressed threads in the molded closure assembly. Depressions 70, spaced about the periphery of the top of core half 41 provide a plurality of spaced apart projections depending from the internal surface of the top of the molded closure between the lip formed in cavity 56 and the skirt of the closure assembly. The internal construction of core half 41 will be detailed in connection with FIGURE 2.

Lower mold half generally designated 42, consists of several cylindrically shaped members, 42a, 42b, 42c, and 42d, all of which have a center bore to accommodate core 41 and its surrounding and tightly fitting ejector sleeve 43. With the mold halves in the closed position, the flared upper end 43a of sleeve 43 seats against the lower edge of member 32d. Member 42c, in particular, has an enlarged center bore on its upper end, thereby defining annular-shaped chamber 44. Disposed in chamber 44 are cylindrical members 46 and 47, having center bores equivalent to the diameter of sleeve 43. Members 46 and 47 are anchored to the latter by pins 48a and 48b. Allen screw 49 seats in the lower face of member 42d, and secures the same to a threaded recess in the lower end of core section 41. Protruding from an anchored end frame 51 are two flat-end rigid rods 52 and 53 which slidably pass through member 42d and fixedly extend a limited distance into chamber 44, thereby limiting the downward travel of member 47.

In FIGURE 2, inner core half 41 of the mold is shown in full section. The annular inclined lip cavity 56 is defined by counter-bored outer cylinder 57 and flange-shaped insert 58. A counter bore 61 in the lower end of cylinder 57 is adapted to receive a socket head cap screw 59, which takes up into a threaded recess 62 in the lower end of insert 58. A resilient O-ring 63, fabricated from a thermosetting such as Viton A (a copolymer of hexafluoropropylene and vinylidene fluoride is disposed between the shoulder of cap 59 and the top of bore 61, being only slightly compressed when the cap is fully threaded into bore 62. Similarly, a weak coil spring may be employed in place of an O-ring to normally bias insert 58 seated.

A small-diameter tubing 64 is centered in bore 61, terminating just below cap screw 59 to introduce cooling water into the core section from conduit 66. Conduits 67a and 67b are provided to remove water from the annulus defined by cylinder 57 and tubing 61.

The mold die has been described while in the closed position, during which molten plastic is being extruded thereinto.

In operation, pelleted thermoplastic resin is fused into a polymer melt by heaters (not shown). A measured quantity of melt is extruded into sprue 33 with each cycle of operation to completely fill cavity 40. A suitable time period is given for the melt to freeze to the shape of the cavity under the influence of cooling water circulating through core section 41.

When the point in the molding cycle is reached for stripping the formed closure from the mold cavity, the following sequence occurs. Mold halves 32 and 42 separate at parting line 37 by half 42 being moved away from half 32, thus concurrently moving core section 41 which is secured to base 42d, sleeve 43, and members 46 and 47 which are tied to sleeve 43 by pins 48a and 48b. Upon contacting stationary rods 52 and 53, the lateral movement of members 46 and 47, and sleeve 43 as well, are stopped, while core section 41 and members 42a to 42d continue their movement. As the core is withdrawn from the formed closure cap, relieving the retaining force on the top thereof, insert 58, which is normally biased seated by O-ring 63, is unseated by the upward pull of inclined lip 21 of the formed cap, thus minimizing the shearing stress on said lip as the cap is stripped from the core section. When the lip pulls free of lip cavity 56, the O-ring again biases insert 58 seated for the next cycle. After the cap drops from between the mold halves, they are shut, and the aforedescribed cycle is repeated.

In FIGURE 3, integrally formed closure cap 11 is shown as formed by the mold of FIGURE 1. Cap 11 comprises central portion 13 and peripheral skirt 14 extending downward from the central portion adapted to enclose the outer surface of the neck of a container. Disposed on the inner surface of skirt 14 is an annular bead 16 defining a spiral thread or portion thereof adapted to take up cap 11 on the neck of a container. Bead 16 can be a plurality of projections disposed in a spiral path. A plurality of projections 18 are disposed adjacent the periphery of the lower surface of central portion 13 adapted to contact the upper rim of a container. An annular, inwardly inclined lip 21 is disposed from central portion 13 and spaced from projections 18 adapted to contact the inner edge of the upper rim of a container. When cap 11 is placed on a container, air is allowed to enter the container by a path around the spiral projection 16, through the spaces between projections 18 and between lip 21 and the rim of the container. The contents of the container are prevented from escaping by lip 21 sealing against the rim of the container.

The invention is applicable to substantially all of the thermoplastic normally solid polymers and resins, such as the polyolefins, and especially high density polyethylene, ranging between 0.960 and 0.980 for articles of good durability. In general, any solid polymer of an aliphatic mono-1-olefin can be used within the scope of this invention. Examples of such starting materials include polymers and copolymers of aliphatic mono-1-olefins, such as ethylene, propylene, butene-1, hexene-1, octene-1, and the like, and blends of these polymers and copolymers. Polymers of aliphatic mono-1-olefins having a maximum of 8 carbon atoms per molecule and no branching nearer the double bond than the fourth position provide thermoplastic containers having particularly desirable properties. Homopolymers and copolymers, as well as mixtures of homopolymers and copolymers are suitable polymeric materials for the articles of the invention.

The polyolefins, especially polyethylenes, that can be employed in the practice of the present invention can be prepared by any of the methods which are usually employed for the preparation of these polymers. The high density polyolefins prepared by the low pressure processes now known are useful in the preparation of the container type articles of the invention. However, the invention is also applicable to the lower density polyolefins as well.

Reasonable variation and modification are possible within the scope of the foregoing disclosure, the drawing and the appended claims to the invention.

What is claimed is:

1. Molding die means for forming integrally a venting-type closure cap from a thermoplastic material comprising:
   (a) first molding die element for defining the outer surface of said closure cap;
   (b) second molding die element for defining the inner surface of said closure cap comprising:
      (1) a cylindrical core section provided with a counter-bored upper end which defines the outer surface of an annular inclined lip cavity;
      (2) an insert adapted to seat within said counter-bored upper end shaped to define the inner surface of said lip cavity;
      (3) means to bias said insert normally tightly seated, disposed within the counter-bored lower end of said core section;
      (4) means secured to the lower end of said insert to retain said biasing means in working position;
   (c) third molding die element comprising a rigid ejector sleeve, the upper edge of which defines at least a portion of the lower edge of said closure cap, said sleeve adapted to become stationary at a point intermediate in the extremes of the lateral movement of said second die element, whereby said upper edge strips said cap from said core section as the latter laterally retracts, and the annular lip on said cap lifts said insert to free said lip with minimal shearing stress from said inclined lip cavity.

2. Molding die means for forming integrally a venting-type closure cap from a thermoplastic material comprising:
   (a) first molding die element for defining the outer surface of said closure cap;
   (b) second molding die element for defining the inner surface of said closure cap comprising:
      (1) a cylindrical core section provided with a counter-bored upper end which defines the outer surface of an annular inclined lip cavity;
      (2) an insert adapted to seat within said counter-bored upper end shaped to define the inner surface of said lip cavity;
      (3) means to bias said insert normally tightly seated, disposed within the counter-bored lower end of said core section;
      (4) means secured to the lower end of said insert to retain said biasing means in working position;
      (5) conduit means communicating with the inside of said core section for circulating cooling water and thereby maintaining the same at a desired temperature level;
   (c) third molding die element comprising a rigid ejector sleeve, the upper edge of which defines at least a portion of the lower edge of said closure cap, said sleeve adapted to become stationary at a point intermediate in the extremes of the lateral movement of said second die element, whereby said upper edge strips said cap from said core section as the latter laterally retracts, and the annular lip on said cap lifts said insert to free said lip with minimal shearing stress from said inclined lip cavity.

3. The die means of claim 1 wherein said biasing means is an O-ring composed of resilient material.

References Cited by the Examiner

UNITED STATES PATENTS

| | | | |
|---|---|---|---|
| 2,635,292 | 4/1953 | Campbell | 264—334 |
| 2,661,518 | 12/1953 | Carlson | 264—334 |
| 2,874,413 | 2/1959 | Grussen | 18—42 |
| 3,013,308 | 12/1961 | Armour. | |
| 3,097,398 | 4/1963 | Inglesby | 18—42 |
| 3,152,365 | 10/1964 | Fisher | 18—42 |

FOREIGN PATENTS

| | | |
|---|---|---|
| 1,151,184 | 8/1957 | France. |

J. SPENCER OVERHOLSER, *Primary Examiner.*

ROBERT F. WHITE, *Examiner.*